United States Patent
Boyer et al.

(10) Patent No.: US 10,457,795 B2
(45) Date of Patent: Oct. 29, 2019

(54) SILOXANE CROSSLINKING PROCESSES EMPLOYING SULFUR COMPOUNDS AND PLATINUM CATALYSTS

(71) Applicant: Momentive Performance Materials Inc., Waterford, NY (US)

(72) Inventors: Julie L. Boyer, Columbia, MD (US); Aroop Kumar Roy, Mechanicville, NY (US)

(73) Assignee: MOMENTIVE PERFORMANCE MATERIALS, INC., Waterford, NY (US)

( * ) Notice: Subject to any disclaimer, the term of this patent is extended or adjusted under 35 U.S.C. 154(b) by 0 days.

(21) Appl. No.: 15/742,564

(22) PCT Filed: Jan. 13, 2016

(86) PCT No.: PCT/US2016/013223
§ 371 (c)(1),
(2) Date: Jan. 8, 2018

(87) PCT Pub. No.: WO2017/007512
PCT Pub. Date: Jan. 12, 2017

(65) Prior Publication Data
US 2018/0194931 A1   Jul. 12, 2018

Related U.S. Application Data

(60) Provisional application No. 62/190,474, filed on Jul. 9, 2015.

(51) Int. Cl.
| | | |
|---|---|---|
| *C08K 5/37* | (2006.01) | |
| *C08K 5/372* | (2006.01) | |
| *C08K 5/05* | (2006.01) | |
| *C08G 77/12* | (2006.01) | |
| *C08G 77/20* | (2006.01) | |
| *C08K 5/56* | (2006.01) | |
| *C08L 83/00* | (2006.01) | |
| *C08L 83/04* | (2006.01) | |
| *B01J 31/28* | (2006.01) | |
| *C08J 3/24* | (2006.01) | |

(52) U.S. Cl.
CPC .............. *C08K 5/372* (2013.01); *B01J 31/28* (2013.01); *C08G 77/12* (2013.01); *C08G 77/20* (2013.01); *C08J 3/242* (2013.01); *C08K 5/05* (2013.01); *C08K 5/37* (2013.01); *C08K 5/56* (2013.01); *C08L 83/00* (2013.01); *C08L 83/04* (2013.01)

(58) Field of Classification Search
CPC . C08K 5/372; C08K 5/05; C08K 5/37; C08G 77/12; C08G 77/20; C08L 83/04
See application file for complete search history.

(56) References Cited

U.S. PATENT DOCUMENTS

| | | | |
|---|---|---|---|
| 4,906,719 A | 3/1990 | Chu et al. | |
| 5,548,006 A * | 8/1996 | Hirabayashi | C08K 5/0025 524/100 |
| 5,977,249 A * | 11/1999 | Kovar | C08K 5/36 524/723 |
| 5,998,548 A | 12/1999 | Brennenstuhl et al. | |
| 6,191,297 B1 | 2/2001 | Batz-Sohn et al. | |
| 6,303,728 B1 * | 10/2001 | Hagimori | C08F 8/42 528/15 |
| 6,747,079 B2 * | 6/2004 | Bressieux | C08K 5/3435 524/302 |
| 10,351,704 B2 * | 7/2019 | Nishida | C08K 5/36 |
| 2002/0192528 A1 | 12/2002 | Sixt et al. | |
| 2004/0116547 A1 | 6/2004 | Bennington | |
| 2010/0255205 A1 | 10/2010 | Cray et al. | |
| 2012/0322942 A1 | 12/2012 | Berghmans et al. | |
| 2016/0319086 A1 | 11/2016 | Pouget | |
| 2017/0306150 A1 * | 10/2017 | Nishida | C08K 5/36 |

FOREIGN PATENT DOCUMENTS

WO     2015068859     5/2015

OTHER PUBLICATIONS

Patent Cooperation Treaty (PCT), International Search Report and Written Opinion for Application PCT/US2016/013223 filed on Jan. 13, 2016, dated Mar. 11, 2016, International Searching Authority, US.
Perales, J. et al., "Thioether-Directed Platinum-Catalyzed Hyrdosilylation of Olefins." J. Org. Chem., vol. 66, 2001, pp. 7270-7274.
Downing, C. et al., "Diethyl sulfide stabilization of platinum-complex catalysts for hydrosilyation of olefins." Catalysis Communications, vol. 12., 2011, pp. 1166-1169.
Steffanut, P. et al., "Efficient Homogeneous Hydrosilylation of Olefins by Use of Complexes of Pt with Selected Electron-Deficient Olefins as Ligands." Chem. Eur. J. vol. 4, 1998, pp. 2008-2017.
Extended European Search Report dated Dec. 13, 2018; European Patent Application No. 16821760.2 titled, "Siloxane Crosslinking Processes Employing Sulfur Compounds and Platinum Catalysts."

* cited by examiner

*Primary Examiner* — Margaret G Moore
(74) *Attorney, Agent, or Firm* — McDonald Hopkins LLC; Joseph Waters (57) ABSTRACT

Provided is a composition and process for producing a crosslinked product. The composition comprises a mixture constituting (a) an alkenyl silicone, (b) a hydrogen siloxane, (c) a cure inhibitor and (d) a hydrosilylation catalyst, optionally in the presence of a solvent, and (e) sulfur compounds in order to produce the crosslinked product, and the process comprises reacting such a composition to form a crosslinked product.

28 Claims, 2 Drawing Sheets

SILOXANE CROSSLINKING PROCESSES EMPLOYING SULFUR COMPOUNDS AND PLATINUM CATALYSTS

CROSS-REFERENCE TO RELATED APPLICATIONS

The present application claims priority to and the benefit of International Application PCT/US2016/013223 filed Jan. 13, 2016, which claims priority to and the benefit of U.S. Provisional Application 62/190,474 filed Jul. 9, 2015, the disclosure of which is incorporated herein by reference in its entirety.

FIELD OF THE INVENTION

The present invention relates generally to the use of sulfur compounds in siloxane crosslinking reactions.

BACKGROUND

Hydrosilylation chemistry, involving the reaction between a silylhydride and an unsaturated organic group, is the basis for many addition cured products including sealants, elastomers, RTVs, adhesives, and silicone-based coatings. Addition cured silicone formulations are typically comprised of:
  (A) an alkenyl substituted polysiloxane that is the primary component or base polymer of the curable composition;
  (B) a hydride functional crosslinking silicone, typically a methyl hydrogen siloxane polymer, copolymer or oligomer;
  (C) a highly active addition cure hydrosilylation catalyst, typically a platinum (0) catalyst such as Ashby's or Karsedt's;
  (D) a cure inhibiting compound or mixtures thereof to increase the useful life of the complete formulation.

Addition curable silicone formulations of such compositions must have both rapid cure at elevated temperature and an acceptably long working life (i.e., no crosslinking) of the full formulation at or near room temperature. Storage stability may also be an important requirement. These needs are particularly acute for release coating formulations where perhaps the most stringent demand is placed on the catalyst for extremely fast cure at high line coating speeds and very short oven-dwell times (2-5 seconds), together with good bath life of the formulation. Yet, the formulation must essentially completely cure in seconds at elevated temperature to meet release performance requirements on a plethora of different paper and polymeric substrates.

To accommodate these two opposing demands, two part formulations with high platinum loadings and high inhibitor loadings are typically employed in the industry. This current solution has several distinct disadvantages. High platinum catalyst loadings are required in addition curable systems to ensure rapid and complete cure at elevated temperature but this high loading of precious metal catalysts also imparts a significant catalyst cost to the formulation. In addition to cure performance, high platinum catalyst levels are especially needed in release liner applications to ensure adequate anchorage to the substrate. High levels of inhibitors are employed to retard catalyst activity and to extend working life of the formulation at room temperature, but the inhibitors employed may not be rapidly decomplexed from the platinum center at elevated temperature and slow the desired crosslinking reaction at elevated temperature.

A variety of different hydrosilylation catalysts can be used to produce organofunctional silanes and silicone fluids. The catalysts employed in these types of reactions can include Pt (II), Pt (IV) and Pt (0) compounds and complexes the most common being chloroplatinic acid or Karstedt's catalysts. Catalysts for cure reactions, however, require additional characteristics to be successful such as high activity and good-to-excellent solubility in a siloxane matrix. Only platinum (0) compounds such as Ashby's or Karstedt's catalysts easily meet these requirements and are the typical catalysts employed in siloxane crosslinking reactions.

The use of additives to stabilize platinum hydrosilylation catalysts as homogeneous species is an effective way to prevent or reduce active metal loss to aggregation. Steffanut, et al. have reported the use of naphthaquinone derivatives together with Karstedt's catalyst to extend the life of the active Pt during hydrosilylation reactions (Steffanut, P.; Osborn, J. A.; DeCian, A.; Fisher, *J. Chem. Eur. J.* 1998, 4, 2008.) The use of thiol-containing substrates and/or additives has been reported to enhance the catalysis in hydrosilylation reactions producing organofunctional silanes using highly active substrates such as alkylsilanes or chlorosilanes as the silyl hydride source. Vranken has reported the chloroplatinic acid catalyzed reactions run with homoallylic thioether and $PhMe_2SiH$ substrates. The reactions run with substrates containing a thioether functional group displayed higher yields than reactions run with analogous alkyl substituted olefins. (Perales, J. B.; Vranken, D. L. V., Thioether-Directed Platinum-Catalyzed Hydrosilylation of Olefins. *J. Org. Chem.* 2001, 66 (22), 7270-7274.) Kung demonstrated the use of $Et_2S$ additives in Karstedt catalyzed reactions with chlorosilanes and alkylsilanes. The reactions that contained the $Et_2S$ additive showed higher yields than those reactions run in the absence of the thioether stabilizer (Downing, C. M.; Kung, H. H., Diethyl sulfide stabilization of platinum complexes catalysts for hydrosilylation of olefins. *Catalysis Communications* 2011, 12, 1166-1169).

Organic sulfur compounds or sulfur containing siloxanes have been used to produce silicone rubbers that are resistant to degradation in the harsh environments such as fuel cell conditions (i.e., in the presence of $H_2$, $O_2$ and air at high temperatures). Use of compositions which can be crosslinked to give degradation-stable silicone rubbers as sealing compositions in fuel cells has been reported (U.S. Publication No. 2002/0192528). Here, the organosulfur compounds appear to play the role of an anti-oxidant.

Additives that are useful for one type of reaction may not be useful in other systems. This is the case even in hydrosilylation chemistry where materials for use in systems using silanes to provide silylated products cannot be expected to be useful in promoting curing of a vinyl compound with a siloxyhydride. It is also well known that sulfur and its compounds are common poisons to metal catalysts. Further, industry work-horse catalysts such as Karstedt's are prone to partial deactivation via agglomeration, especially at elevated temperatures of use.

In addition to improvements in catalysis, it is often desired to enhance or alter certain material properties of the crosslinked material. In particular, the production of coatings with a highly aesthetic finish or gloss is desired especially in film casting, decorative vinyl covers or coatings of graphic art or decals. To achieve a high gloss finish, the industry typically employs solvent containing formulations (>70% solvent) and slow line speeds or two stage drying setups. The use of solvent is undesirable from a health and operating cost perspective.

It is also desirable to be able to cure silicone coatings at lower temperatures. The high temperatures used in the cure of coatings today is undesirable in terms of cost (heating cost and necessitates additional equipment such as humidifiers, etc in the case of paper substrates) and is not compatible with certain substrates (films with low $T_g$).

SUMMARY

The present invention provides the use of sulfur compounds in crosslinking reactions. It has been found that sulfur compounds may be used as catalyst additives in crosslinking reactions and exhibit acceptable to very good activity at low platinum loadings and low inhibitor loadings. In particular, it has unexpectedly been found that sulfur compounds may be used as additives to enhance the activity of platinum catalysts in cure/crosslinking systems. The new catalysts show desirable catalysis improvements such as reduced level of Pt use and rapid cure. In addition to the catalysis improvements, the coated materials displayed glossier coatings and better cure at lower temperatures.

The present process and compositions may provide improved properties to hydrosilylation reactions and particularly to crosslinking reactions. The present process and compositions may provide improved stability of the active catalyst and may enable the lowering of Pt catalyst loadings. In addition to improved stability, the process and composition may provide catalysts that demonstrate rapid activation and high hydrosilylation activity at elevated temperature.

In one aspect, the present invention is directed to a process for producing a crosslinked product comprising reacting a mixture constituting (a) an alkenyl silicone, (b) a hydrogen siloxane, (c) a cure inhibitor and (d) a hydrosilylation catalyst, optionally in the presence of a solvent, and (e) a sulfur compound to produce the crosslinked product.

Polymers produced in accordance with the present processes may be used to form release coating materials, elastomers, coatings, other cured materials, elastomeric gels, etc.

In one aspect, the present invention provides a process for producing a crosslinked product comprising reacting a mixture constituting (a) an alkenyl silicone, (b) a hydrogen siloxane, (c) a cure inhibitor and (d) a hydrosilylation catalyst, optionally in the presence of a solvent, and (e) a sulfur compound in order to produce the crosslinked product, the sulfur compound (e) being a compound of the formula:

where $R^1$ and $R^2$ are independently chosen from a H, a substituted or unsubstituted alkyl, a substituted or unsubstituted aryl group, the alkyl and/or aryl groups optionally comprising at least one heteroatom, with the proviso that Formula I is not $H_2S$.

In one embodiment, $R^1$ and $R^2$ are independently chosen from a C1-C20 alkyl, a C1-C20 hydroxyalkyl, a C1-C20 carboxylic acid, or a combination of two or more thereof. In one embodiment, R1 and R2 are each chosen from a C1-C20 alkyl. In one embodiment, R1 is chosen from a C1-C20 alkyl, and R2 is chosen from a C1-C20 hydroxyalkyl.

In one embodiment, the present invention provides a process according to any previous embodiment, wherein the hydrosilylation catalyst (d) comprises a metal, and the ratio of total moles of the sulfur compound (e) to moles of the metal in catalyst (d) is from about 1:1 to about 100:1.

In one embodiment, the present invention provides a process according to any previous embodiment, wherein the hydrosilylation catalyst (d) comprises a metal, and the ratio of total moles of the sulfur compound (e) to moles of the metal in catalyst (d) is from about 1:1 to about 10:1.

In one embodiment, the present invention provides a process according to any previous embodiment comprising the inhibitor (c) in an amount of from about 0.001 to about 10% by weight of the mixture.

In one embodiment, the present invention provides a process according to any previous embodiment comprising the inhibitor (c) in an amount of from about 0.01 to about 0.1% by weight of the mixture.

In one embodiment, the present invention provides a process according to any previous embodiment, wherein the hydrosilylation catalyst is a platinum-based catalyst, and the platinum is present in an amount of from about 100 parts per billion to about 100 parts per million.

In one embodiment, the present invention provides a process according to any previous embodiment, wherein the platinum is present in an amount of from about 1 ppm to about 50 ppm.

In one embodiment, the present invention provides a process according to any previous embodiment, wherein the curable alkenyl silicone is of the formula:

wherein $M^{vi}_a = R^3_2 R^4 SiO_{1/2}$; $T_b = R^5 SiO_{3/2}$ where $R^5$ is chosen from $R^3$ or $R^4$; $D_c = R^3 R^5 SiO_{2/2}$ where $R^5$ is chosen from $R^3$ or $R^4$; $M_d = R^3_3 SiO_{1/2}$; and $Q_e = SiO_{4/2}$; $R^3$ is independently selected from a monovalent hydrocarbon radical having one to forty carbon, optionally containing at least one heteroatom; and $R^4$ is selected from a terminal olefinic monovalent hydrocarbon radical having two to forty carbon atoms, optionally containing at least one heteroatom, where the composition of the alkenyl silicone comprises at least two unsaturated groups reactive to hydrosilylation per chain; a≥0, b≥0, d≥0, e≥0; values for c in particular are determined by the desired properties and attributes of the cross-linked material so that the sum a+b+c+d+e is in the range 50-20,000.

In one embodiment, the present invention provides a process according to any previous embodiment, wherein the hydrogen siloxane is chosen from a compound of the formula $M_{a'} M^H_{b'} D_{c'} D^H_{d'} T_{e'} T^H_{f'} Q_{g'}$, where the subscripts a', b', c', d', e', f, and g are such that the molar mass of the siloxane-type reactant is between 100 and 100,000 Dalton; M is a monofunctional group of formula $R^6_3 SiO_{1/2}$, D is a difunctional group of formula $R^{15}_2 SiO_{2/2}$, T is a trifunctional group of formula $R^7 SiO_{3/2}$, and Q is a tetrafunctional group of formula $SiO_{4/2}$, $M^H$ is $HR^8_2 SiO_{1/2}$, $T^H$ is $HSiO_{3/2}$, and $D^H$ is $R^{10} HSiO_{2/2}$, where each occurrence of $R^{6-10}$ is independently chosen from a C1-C40 alkyl, a C1-C40 substituted alkyl, a C6-C14 aryl or substituted aryl, wherein $R^{6-10}$ optionally contains at least one heteroatom.

In one embodiment, the present invention provides a process according to any previous embodiment, wherein the inhibitor is chosen from an ethylenically unsaturated amide, an aromatically unsaturated amide, an acetylenic compound, an ethylenically unsaturated isocyanate, an olefinic siloxane, an unsaturated hydrocarbon diester, an unsaturated hydrocarbon mono-ester of an unsaturated acid, a conjugated or isolated ene-yne, a hydroperoxide, a ketones, a sulfoxide, an amine, a phosphine, a phosphite, a nitrite, a diaziridine, or a combination of two or more thereof.

In one embodiment, the present invention provides a process according to any previous embodiment, wherein the reaction is completed in about 10 seconds or less.

In one embodiment, the present invention provides a process according to any previous embodiment, wherein the process is conducted by heating at a temperature of from about 0 to about 300° F.

In one embodiment, the present invention provides a process according to any previous embodiment, wherein components (a)-(d) are provided in a single composition.

In one embodiment, the present invention provides a process according to any previous embodiment, wherein components (a) and (e) are provided in a first part (i) optionally comprising component (c); component (b) is provided in a second part (ii); and component (d) is provided in a third part (iii), and the process comprises mixing parts (i), (ii), and (iii) to conduct the reaction.

In one embodiment, the present invention provides a process according to any previous embodiment, wherein component (a) and optionally component (c) is provided in a first part; component (b) is provided in a second part (ii); and components (d) and (e) are provided in a third part (iii).

In another aspect, the present invention provides a composition for producing a crosslinked product, the composition comprising (a) an alkenyl silicone, (b) a hydrogen siloxane, (c) a cure inhibitor and (d) a hydrosilylation catalyst, optionally in the presence of a solvent, and (e) a sulfur compound in order to produce the crosslinked product, the sulfur compound (e) being a compound of the formula:

where $R^1$ and $R^2$ are independently chosen from a H, a substituted or unsubstituted alkyl, a substituted or unsubstituted aryl group, the alkyl and/or aryl groups optionally comprising at least one heteroatom, with the proviso that Formula I is not $H_2S$.

In one embodiment, R1 and R2 $R^1$ and $R^2$ are independently chosen from a C1-C20 alkyl, a C1-C20 hydroxyalkyl, a C1-C20 carboxylic acid, or a combination of two or more thereof. In one embodiment, R1 and R2 are each chosen from a C1-C20 alkyl. In one embodiment, R1 is chosen from a C1-C20 alkyl, and R2 is chosen from a C1-C20 hydroxyalkyl.

In one embodiment, the present invention provides a composition according to any previous embodiment, wherein the hydrosilylation catalyst (d) comprises a metal, and the ratio of total moles of the sulfur compound (e) to moles of the metal in catalyst (d) is from about 1:1 to about 100:1.

In one embodiment, the present invention provides a composition according to any previous embodiment, wherein the hydrosilylation catalyst (d) comprises a metal, and the ratio of total moles of the sulfur compound (e) to moles of the metal in catalyst (d) is from about 1:1 to about 10:1.

In one embodiment, the present invention provides a composition according to any previous embodiment comprising the inhibitor (c) in an amount of from about 0.001 to about 10% by weight of the mixture.

In one embodiment, the present invention provides a composition according to any previous embodiment comprising the inhibitor (c) in an amount of from about 0.01 to about 0.1% by weight of the mixture.

In one embodiment, the present invention provides a composition according to any previous embodiment, wherein the hydrosilylation catalyst is a platinum-based catalyst, and the platinum is present in an amount of from about 100 parts per billion to about 100 parts per million.

In one embodiment, the present invention provides a composition according to any previous embodiment, wherein the platinum is present in an amount of from about 1 ppm to about 50 ppm.

In one embodiment, the present invention provides a composition according to any previous embodiment, wherein the curable alkenyl silicone is of the formula:

wherein $M^{vi}_a=R^3_2R^4SiO_{1/2}$; $T_b=R^5SiO_{3/2}$ where $R^5$ is chosen from $R^3$ or $R^4$; $D_c=R^3R^5SiO_{2/2}$ where $R^5$ is chosen from $R^3$ or $R^4$; $M_d=R^3_3SiO_{1/2}$; and $Q_e=SiO_{4/2}$; $R^3$ is independently selected from a monovalent hydrocarbon radical having one to forty carbon, optionally containing at least one heteroatom; and $R^4$ is selected from a terminal olefinic monovalent hydrocarbon radical having two to forty carbon atoms, optionally containing at least one heteroatom, where the composition of the alkenyl silicone comprises at least two unsaturated groups reactive to hydrosilylation per chain; a≥0, b≥0, d≥0, e≥0; values for c in particular are determined by the desired properties and attributes of the cross-linked material so that the sum a+b+c+d+e is in the range 50-20,000.

In one embodiment, the present invention provides a composition according to any previous embodiment, wherein the hydrogen siloxane is chosen from a compound of the formula $M_{a'}M^H_{b'}D_{c'}D^H_{d'}T_{e'}T^H_{f'}Q_{g'}$, where the subscripts a', b', c', d', e', f, and g are such that the molar mass of the siloxane-type reactant is between 100 and 100,000 Dalton; M is a monofunctional group of formula $R^6_3SiO_{1/2}$, D is a difunctional group of formula $R^{15}_2SiO_{2/2}$, T is a trifunctional group of formula $R^7SiO_{3/2}$, and Q is a tetrafunctional group of formula $SiO_{4/2}$, $M^H$ is $HR^8_2SiO_{1/2}$, $T^H$ is $HSiO_{3/2}$, and $D^H$ is $R^{10}HSiO_{2/2}$, where each occurrence of $R^{6-10}$ is independently chosen from a C1-C40 alkyl, a C1-C40 substituted alkyl, a C6-C14 aryl or substituted aryl, wherein $R^{6-10}$ optionally contains at least one heteroatom.

In one embodiment, the present invention provides a composition according to any previous embodiment, wherein the inhibitor is chosen from ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated or isolated ene-ynes, hydroperoxides, ketones, sulfoxides, amine, phosphines, phosphites, nitrites, diaziridines, or a combination of two or more thereof.

In still another aspect, the present invention provides a cured material prepared from the process or composition according to any of the previous embodiments. In one embodiment, the cured material is a coating.

The present invention also provides a substrate having a surface thereof at least partially coated with the coating of any of the previous embodiments. In one embodiment, the coating is a release coating.

These and other aspects and embodiments are further understood with reference to the following detailed description.

DETAILED DESCRIPTION

In one aspect, the present invention is directed to a process for producing a crosslinked product comprising reacting a mixture constituting (a) an alkenyl silicone, (b) a hydrogen siloxane, (c) a cure inhibitor and (d) a hydrosilylation catalyst, optionally in the presence of a solvent, and (e) a sulfur compound to produce the crosslinked product.

The component (e) is not narrowly limited and may be chosen from a variety of sulfur compounds. In embodiments, the sulfur compound is chosen from an organic sulfide. In one embodiment, the sulfur compound (e) comprises a thioether described by Formula (I) or an adduct thereof;

Formula (I)

where R$^1$ and R$^2$ are independently chosen from a H, a substituted or unsubstituted alkyl, a substituted or unsubstituted aryl group, the alkyl and/or aryl groups optionally comprising at least one heteroatom, with the proviso that Formula I is not H$_2$S. In embodiments, R$^1$ and R$^2$ are each independently hydrocarbyl or inertly-substituted hydrocarbyl groups of from 1 to about 24 carbon atoms, or they are joined to form a 5- or 6-membered saturated heterocycle with the sulfur atom being one member of the heterocyclic ring and the remaining members of the ring are carbon or, the heterocyclic ring may optionally contain one non-adjacent atom of oxygen, relative to the sulfur atom in the ring. In embodiments, R1 and R2 are substituted hydrocarbons comprising hydroxyl groups, carboxylic acid groups, etc. In embodiments, R$^1$ and R$^2$ are independently chosen from a C1-C20 alkyl, a C1-C20 hydroxyalkyl, a C1-C20 carboxylic acid, or a combination of two or more thereof. Examples of suitable such sulfides include, but are not limited to, dibutylsulfide, dioctylsulfide, methyldodecylsulfide, methyloctadecylsulfide, ethyl phenyl sulfide, butyl tolyl sulfide, methallylsulfide, diallyl sulfide, cyclohexyl methyl sulfide, methylphenylsulfide, methylthioacetic acid, methylthioethanol, ethylthioethanol, butylthioethanol, thiodiethanol, bis(2-hydroxypropyl)sulfide, bis(2-hydroxybutyl)sulfide, bis(2-chloroethyl)sulfide, tetrahydrothiophene, p-thioxane, etc. or a combination of two or more thereof.

In embodiments, the sulfur compound (e) has a boiling point of about 100° C. or higher, about 150° C. or higher, about 200° C. or higher, about 250° C. or higher, even about 300° C. or higher. In embodiments, the sulfur compound (e) has a boiling point of from about 100° C. to about 450° C., from about 150° C. to about 400° C., even from about 200° C. to about 350° C.

The amount of component (e) that can be used in the compositions of this invention is not narrowly limited. The amount of component (e) may be expressed in terms of the ratio of the total moles of sulfur compound (e) to the total moles of the catalyst metal center in catalyst (d). In embodiments, the ratio of total moles of sulfur compound (e) to total moles of the catalyst metal center is from 1:1 to 100:1; 1:1 to 20:1; 2:1 to 10:1; even from about 3:1 to about 7:1. In embodiments, the ratio of total moles of additive (e) to total moles of the metal center is from about 1:1 to about 5:1. Here as elsewhere in the specification and claims, numerical values can be combined to form new and alternative ranges.

The alkenyl silicone (a) may be an alkenyl functional silane or siloxane that is reactive to hydrosilylation. The alkenyl silicone may be cyclic, aromatic, or a terminally-unsaturated alkenyl silane or siloxane. The alkenyl silicone may be chosen as desired for a particular purpose or intended application. In one embodiment the alkenyl silicone comprises at least two unsaturated groups and has a viscosity of at least about 50 cps at 25° C. In one embodiment the alkenyl silicone has a viscosity of at least about 75 cps at 25° C.; at least about 100 cps at 25° C.; at least 200 cps at 25 25° C.; even at least about 500 cps at 25° C. Here as elsewhere in the specification and claims, numerical values may be combined to form new and non-disclosed ranges.

In one embodiment, the alkenyl silicone is a compound of the formula:

wherein $M^{vi}_a = R^3_2R^4SiO_{1/2}$; $T_b = R^5SiO_{3/2}$ where $R^5$ is chosen from $R^3$ or $R^4$; $D_c = R^3R^5SiO_{2/2}$ where $R^5$ is chosen from $R^3$ or $R^4$; $M_d = R^3_3SiO_{1/2}$; and $Q_e = SiO_{4/2}$; $R^3$ is independently selected from a monovalent hydrocarbon radical having one to forty carbon, optionally containing at least one heteroatom; and $R^4$ is selected from a terminal olefinic monovalent hydrocarbon radical having two to forty carbon atoms, optionally containing at least one heteroatom. In embodiments, $R^3$ is chosen from a C1-C10 monovalent hydrocarbon radical, even a C1-C4 monovalent hydrocarbon radical. In embodiments, $R^4$ is chosen from a C2-C10 terminal olefinic monovalent hydrocarbon radical, even a C2-C4 terminal olefinic monovalent hydrocarbon radical. The composition of the alkenyl silicone is such as to provide at least two unsaturated groups reactive to hydrosilylation per chain; a≥0, b≥0, d≥0, e≥0; values for c in particular are determined by the desired properties and attributes of the cross-linked material so that the sum a+b+c+d+e is in the range 50-20,000. In embodiments, a and b have values ranging from about 2 to about 5, c is an integer ranging from about 50 to about 1,000, d has a value ranging from 0 to 0.5, from 0.25 to about 0.5, from about 0.35 to about 0.5, even from 0.4 to about 0.5, and e has a value 0-20.

Particular alkenyl silicones and cross-linkers chosen to generate desired mechanical, thermal and other properties of the product can be determined by those skilled in the art. Terminally-unsaturated alkenyl silicone materials are particularly suitable for forming cured or crosslinked products such as coatings and elastomers. It is also understood that two or more of these alkenyl silicones, independently selected, may be used in admixture in a cure formulation to provide desired properties.

The silyl hydride employed in the reactions is not particularly limited. It can be, for example, any compound chosen from hydrosiloxanes including those compounds of the formula $M_aM^H_bD_cD^H_dT_eT^H_fQ_g$, where M, D, T, and Q have their usual meaning in siloxane nomenclature, with the proviso that when X is halide, the unsaturated substrate is not an alkyne. The subscripts a, b, c, d, e, f, and g are such that the molar mass of the siloxane-type reactant is between 100 and 100,000 Dalton. In one embodiment, an "M" group represents a monofunctional group of formula $R^6_3SiO_{1/2}$, a "D" group represents a difunctional group of formula $R^7_2SiO_{2/2}$, a "T" group represents a trifunctional group of formula $R^8SiO_{3/2}$, and a "Q" group represents a tetrafunctional group of formula $SiO_{4/2}$, an "$M^H$" group represents $HR^9_2SiO_{1/2}$, a "$T^H$" represents $HSiO_{3/2}$, and a "$D^H$" group represents $R^{10}HSiO_{2/2}$. Each occurrence of $R^{6-10}$ is independently C1-C18 alkyl, C1-C18 substituted alkyl, C6-C14 aryl or substituted aryl, wherein $R^{6-10}$ optionally contains at least one heteroatom. In embodiments, R6-10 are independently chosen from a C1-C10 alkyl, even a C1-C6 alkyl. It is also understood that two or more such hydrogensiloxanes may be used together in a curable formulation.

The components (a) and (b) that are used in the compositions of this invention are not narrowly limited. Said amounts, expressed in terms of the ratio of the number of silicon-bonded hydrogen atom of component (b) to the number of silicon-bonded olefinic hydrocarbon radicals of component (a), typically are sufficient to provide a value of said ratio from 1:100 to 110:1, from 1:20 to 20:1, and even from 0.5:1 to 20:1. Here as elsewhere in the specification and claims, numerical values can be combined to form new and alternative ranges.

Inhibitors for component (c) of the platinum group metal catalysts are not particularly limited and may be chosen as desired for a particular purpose or intended use. The inhibitor can be chosen from a variety of conventional or known inhibitor materials in the organosilicon art. Examples of suitable inhibitors include, but are not limited to, ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated ene-ynes, hydroperoxides, ketones, sulfoxides, amine, phosphines, phosphites, nitrites, diaziridines, etc. Particularly suitable inhibitors for the compositions are alkynyl alcohols and maleates.

The amount of component (c) to be used in the compositions is not critical and can be any amount that will retard the above described platinum catalyzed hydrosilylation reaction at room temperature while not preventing said reaction at moderately elevated temperature, i.e. a temperature that is 60 to 250'F above room temperature. No specific amount of inhibitor can be suggested to obtain a specified bath life at room temperature since the desired amount of any particular inhibitor to be used will depend upon the concentration and type of the platinum metal containing catalyst, the nature and amounts of components a and b. The range of component (c) can be 0 to about 10% by weight of the composition, about 0.001 wt to 2% by weight of the composition, even about 0.12 to about 1 by weight of the composition. In embodiments, component (c) is present in an amount of from about 0.01 to about 1% by weight of the composition, 0.01 to about 0.1% by weight of the composition, 0.03 to about 0.07% by weight of the composition, even about 0.04 to about 0.06% by weight of the composition. Here as elsewhere in the specification and claims, numerical values can be combined to form new and alternative ranges. In one embodiment, the compositions can be free of any inhibitor component (c).

The composition may optionally further comprise one or more additional ingredients, such as filler, filler treating agent, plasticizer, spacer, extender, biocide, stabilizer, flame retardant, anti-oxidant, surface modifier, pigment, anti-aging additive, rheological additive, anchorage additive, corrosion inhibitor, surfactant or combination thereof.

The concentration of platinum catalyst used in the present process can be varied. In one embodiment, the concentration of platinum is from about 100 parts per billion (ppb) to about 100 part per million (ppm); from about 500 ppb to about 100 ppm; from about 1 ppm to about 50 ppm; even from about 5 ppm to about 30 ppm. Here as elsewhere in the specification and claims, numerical values can be combined to form new and alternative ranges.

The platinum catalyst can be chosen as desired for a particular purpose or intended application. Examples of suitable platinum catalysts include platinum (0) catalysts such as Karstedt's catalyst or Ashby's catalyst.

The platinum catalyst may be dissolved in solvent to improve ease of handling. The solvent is not limited and can be either polar or non-polar. Any solvent can be used in the method of the invention, as long as it facilitates the dissolution of the platinum catalyst, without deleterious effects.

Accordingly, in some embodiments, the present invention is also directed to the compositions produced from the above described methods. These compositions contain the hydrosilylated products of the silylhydride and the compound having at least one unsaturated group. Products can be produced by reacting the components of the composition under conditions to promote formation of a crosslinked product. In one embodiment, the components can be provided as a one part composition comprising at least components (a), (b), (d), and (e), and optionally (c). In another embodiment, the components can be provided in two or more separate compositions and mixed prior to curing. The sulfur compound (e) may be provided with any of components (a), (b), or (d) if the components are provided separately. In one embodiment, the alkenyl silicone (a) and sulfur compound (e) are provided as a first component, optionally with the inhibitor (c); the hydrogen siloxane (b) is provided as a second component; and the catalyst (d) is provided as a third component. In another embodiment, the alkenyl silicone (a) is provided as a first component, optionally with the inhibitor (c); the hydrogen siloxane (b) and sulfur compound (e) are provided as a second component; and the catalyst (d) is provided as a third component. In still another embodiment, the alkenyl silicone (a) is provided as a first component, optionally with the inhibitor (c); the hydrogen siloxane (b) is provided as a second component; and the catalyst (d) and sulfur compound (e) are provided as a third component.

Curing may be accomplished by reacting the components at a temperature of from about 0 to 400° F. (about −17° C. to about 220° C.), and in one embodiment from a temperature of from about 60 to about 300° F. (about 15° C. to about 150° C.). The present compositions are also particularly suitable curing at temperatures between about 220° F. and about 240° F. (about 104° C. to about 116° C.)

The hydrosilylated products that are produced by the process of the present invention have uses in the synthesis of silicone materials such as elastomers, coatings, e.g., release liner coatings, for molding etc. When provided as a coating, the composition is coated onto at least a portion of a surface of a substrate. The amount of the surface coated with the coating composition can be selected as desired for a particular purpose or intended application. Release coatings are part of a laminate wherein a release coating is coated upon a substrate. Generally substrates suitable for release coatings include, but are not limited to, paper, polymeric films such as those consisting of polyethylene, polypropylene, polyester, etc. The use of the present catalysts in coating compositions has been found to provide particularly good curing in a short period of time including in about 10 seconds or less; about 7 seconds or less, even about 5 seconds or less. In one embodiment, curing can be effected in about 2 to about 10 seconds, even about 2 to about 5 seconds. Further, the cured compositions exhibit good binding and can be anchored to substrates including, for example, to paper.

The present compositions and processes may also be used to provide an elastomeric gel material. Gels may be formed from a crosslinked polymer formed as previously described by intimate mixing and swelling of the polymer by one or more active agents, where the active agent becomes entrapped in the gel. Optionally, the intimate mixing and swelling of the polymer by one or more active agents in combination with one or more solvents can be employed to form a gel with entrapped active agents. This is achieved by treating the different possible combinations of polymer with active agents and optionally solvents as described above to shearing forces. To someone skilled in the art, this process is known as "kneading" or "homogenization" of the gel. The crosslinking reaction may also be carried out in a suitable solvent to directly form the elastomer gel.

During the mixing, swelling, and gel formation phase, one or more active agents or one or more active agents in combination with one or more solvents are introduced either at once or in small increments to the now crosslinked polymer before or during the kneading process as described above. In addition, in order to facilitate an intimate mixing and swelling in formation of a gel, the input of mechanical energy in the form of shearing forces also assists the fragmentation of the gel into a desired gel particle size. The crosslinked organopolysiloxane polymer gel networks of the present invention are preferably further processed by a number of processes that introduce mechanical energy into the system to facilitate swelling and formation of the gel into gel particles of a desirable size.

The following examples are intended to illustrate, but in no way limit the scope of the present invention. All parts and percentages are by weight and all temperatures are in Celsius unless explicitly stated otherwise. All patents, other publications, and U.S. patent applications referred to in the instant application are incorporated herein by reference in their entireties.

EXAMPLES

Experimental

The SL6900 (vinylsiloxane, 0.9 wt % vinyl), SL4380 (hydrosiloxane, 1.16 wt % hydride), SL4410 (hydrosiloxane, 1.08 wt % hydride), SL6020D (hydrosiloxane, 1 wt % hydride), ECH (1-ethynyl-1-cyclohexanol), S61 (3,5-dimethylhex-1-yn-3-ol), SL6210 (platinum catalyst, Karstedts, 1000 ppm Pt), and SL6310 (platinum catalyst, Karstedts, 5000 ppm Pt) materials were obtained internally. All other starting materials were purchased from a commercial source and used as received without further purification. The gloss measurements were taken using a 60° gloss meter. The average of 3 measurements on a single sheet of coated paper placed on a piece of black felt is reported. The yellowing (Hazen value, Pt/Co) was determined using BYK liquid color meter.

General Procedure for DSC

Examples 1-6

Figure 1:
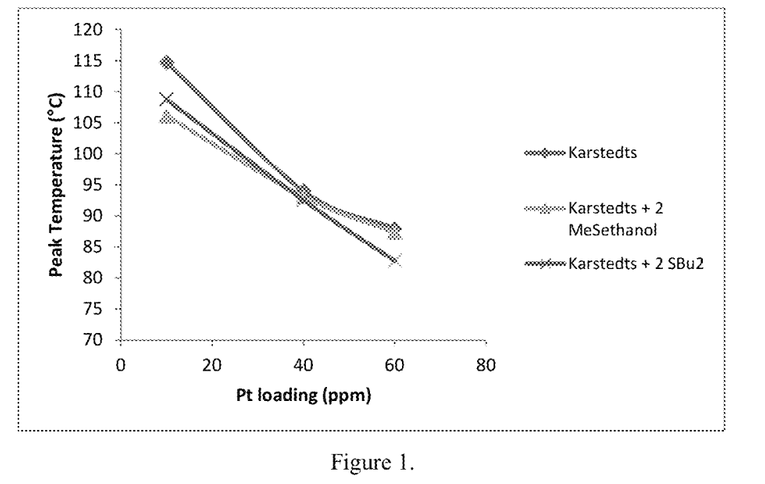
FIG. 1 is a graph comparing peak temperature versus Pt catalyst loading for a control reaction and reactions employing a sulfur additive.

A master batch of formulation was prepared by adding SL6900 (547 g), SL4380 (30 g) and ECH (0.72 g) to an olive jar. The formulation was mixed by vigorously shaking. An aliquot of the master batch (~10 g) was added to a vial. The additive was added. For example, the methylthioethanol (11 uL of 1 wt % solution in xylenes, 0.001 mmol) was added. The catalyst SL6210 (0.09 g, 0.00051 mmol Pt) was added immediately before the DSC was run. The formulation was mixed by vigorously shaking it. The DSC was run. The DSC program equilibrates at 25° C. and then ramps 10° C./min to 200° C. The DSC data is shown in Table 1 and the peak temperature data is plotted in FIG. 1. FIG. 1 shows peak temperature for formulations containing varying amounts of Pt and different additives

TABLE 1

DSC data for formulations with varying amount of Pt with different additives

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Additive | MeSethtanol | MeSethtanol | MeSethtanol | $SBu_2$ | $SBu_2$ | $SBu_2$ | NA | NA | NA |
| Platinum loading | 60 | 40 | 10 | 60 | 40 | 10 | 60 | 40 | 10 |
| Onset Temp. (° C.) | 81.24 | 87.14 | 101.22 | 76.86 | 86.42 | 102.68 | 81.95 | 86.29 | 107 |
| Peak Temp. (° C.) | 87.31 | 93.09 | 106.11 | 82.75 | 92.52 | 108.73 | 87.94 | 94.02 | 114.67 |
| Heat of formation (J/g) | 28.82 | 28.89 | 28.49 | 28.87 | 29.38 | 28.08 | 34.07 | 28.92 | 31.75 |
| T95 (° C.) | 90.13 | 96.6 | 108.51 | 85.01 | 95.59 | 110.88 | 92.6 | 95.27 | 117.85 |
| ΔT95 (° C.) | 8.89 | 9.46 | 7.29 | 8.15 | 9.17 | 8.2 | 10.65 | 8.98 | 10.85 |

Examples 7-10

Examples 7-10 and Comparative Example 4 is prepared in a manner similar to Examples 1-6 except that the composition is prepared with SL6900 as the alkenyl silicone and SL6020 as the silyl hydride, (Si—H/Si-vinyl 1.8) with 0.25 wt % S61 with 30 ppm Pt.

TABLE 2

DSC data for Examples 7-10

|  | Comp. Ex. 4 | Ex. 7 | Ex. 8 | Ex. 9 | Ex. 10 |
|---|---|---|---|---|---|
| Equiv $SBu_2$/Pt | 0 | 1 | 2 | 5 | 10 |
| Onset temperature (° C.) | 86.07 | 75.12 | 80.04 | 81.05 | 77.55 |
| Peak temperature (° C.) | 93.38 | 81.14 | 86.13 | 87.54 | 83.45 |
| Heat of Formation (J/g) | 27.36 | 32.72 | 28.33 | 30.41 | 28.09 |
| T95 (° C.) | 99.05 | 92.08 | 110.49 | 111.82 | 90.28 |
| ΔT95 (° C.) | 12.98 | 16.96 | 30.45 | 30.77 | 12.73 |

General Procedure for Pilot Coater Formulation—Examples 11-19

Figure 2:
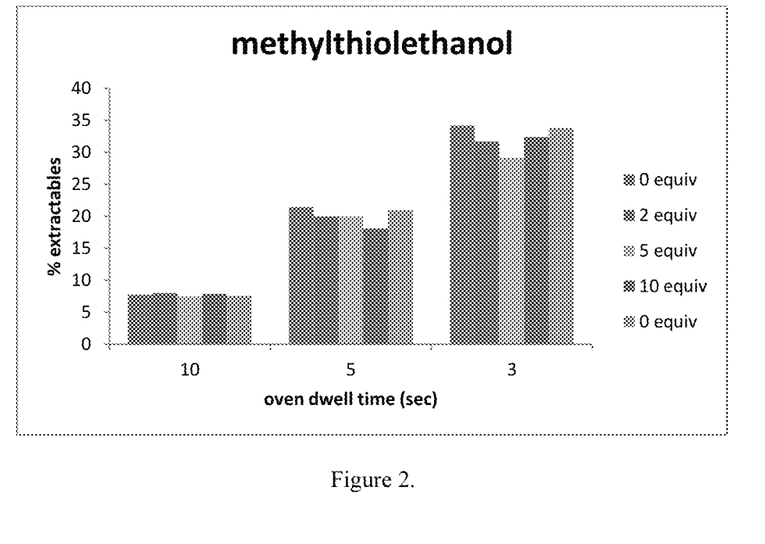
FIG. 2 is a graph comparing the % extractables versus oven dwell time for different loadings of sulfur additive.

A stock batch of formulation was prepared with SL6900 (750 g) and SL6020D1 (45 g) and inhibitor. The additive, methylthioethanol (0.7 g of 1 wt % solution in xylenes), was added to the formulation. The material was mixed. The SL6310 (1.5 g) was added to the formulation. The material was run on the pilot coater at various speeds at 240° F. exit web temperature on a SCK substrate. The coatings were analyzed by % extractables, coat weight, along with smear and migration tests. Table 3 provides the % extractable data for various catalyst loadings and oven dwell times. FIG. 2 provides a graph depicting the results and shows extractable data from the pilot coater runs with the formulations containing varying amounts of methylthiolethanol.

TABLE 3

Data from Coater runs.

| Additive | Equiv Additive/Pt | Oven Dwell Time (s) | % extractables |
|---|---|---|---|
| Ex. 11 | methylthiolethanol | 2 | 10 | 8 |
| Ex. 12 | methylthiolethanol | 2 | 5 | 20 |
| Ex. 13 | methylthiolethanol | 2 | 3 | 31.7 |
| Ex. 14 | methylthiolethanol | 5 | 10 | 7.5 |
| Ex. 15 | methylthiolethanol | 5 | 5 | 20 |
| Ex. 16 | methylthiolethanol | 5 | 3 | 29.2 |
| Ex. 17 | methylthiolethanol | 10 | 10 | 7.9 |
| Ex. 18 | methylthiolethanol | 10 | 5 | 18.1 |
| Ex. 19 | methylthiolethanol | 10 | 3 | 32.4 |
| Comp. Ex. 5 | None | 0 | 10 | 7.7 |
| Comp. Ex. 6 | None | 0 | 5 | 21.4 |
| Comp. Ex. 7 | None | 0 | 3 | 34.2 |

General Procedure for Simple Crosslinking Test

Examples 20-21

A master batch of formulation was prepared with SL6900 (584.66 g), SL4380 (35.34 g) and ECH (0.24 g). An aliquot (~150 g) of the master batch was placed in an olive jar. The $SBu_2$ (0.114 g of a 10 wt % solution in xylenes) was added to the olive jar. The SL6210 (6.23 g) was added to the olive jar. The initial viscosity was taken at 25° C. The olive jar was heated to 40° C. for 4 hr. The final viscosity was taken after the material had equilibrated for 20 minutes in a 25° C. bath. Table 4 shows the results of the runs.

TABLE 4

Time to gel for formulations with and without sulfur additives.

| | 20 ppm Pt/0.04% ECH | | |
|---|---|---|---|
| | Comp. Ex. 8 | Ex. 20 5 equiv $SBu_2$ | Ex. 21 5 equiv $MeSC_2H_4OH$ |
| initial cps | 124 | 122.3 | 121 |
| final cps (4 h) | 174 | gelled | gelled |

Formulation heated to 40° C. Formulations contained SL6900/SL4380 and ECH.

Examples 22-39 (Comparative Examples 9-17)

Examples 22-39 were run in a manner similar to Examples 11-19 except that the formulation contained SL6900/SL4410 (Si—H/Si-vinyl=1.9) and 0.13 wt % S61 on CCK. The examples using the sulfur based additives included 5 molar equivalents of sulfur compound to 1 mole of platinum. The reaction temperature and oven dwell time was varied as indicated in Table 5.

TABLE 5

Cure data for formulation with and without sulfur additives

| | additive | Temperature (F.) | Oven dwell time (s) | Extractables |
|---|---|---|---|---|
| Comp. Ex. 9 | none | 220 | 10.0 | 20.8 |
| Comp. Ex. 10 | none | 220 | 6.0 | 35.3 |
| Comp. Ex.11 | none | 220 | 4.0 | 48.1 |
| Comp. Ex. 12 | none | 235 | 10.0 | 10.8 |
| Comp. Ex. 13 | none | 235 | 6.0 | 18.8 |
| Comp. Ex. 14 | none | 235 | 4.0 | 28.5 |
| Comp. Ex. 15 | none | 250 | 10.0 | 7.5 |
| Comp. Ex. 16 | none | 250 | 6.0 | 9.9 |
| Comp. Ex. 17 | none | 250 | 4.0 | 21.8 |
| Ex. 22 | $SBu_2$ | 220 | 10.0 | 16.8 |
| Ex. 23 | $SBu_2$ | 220 | 6.0 | 26.3 |
| Ex. 24 | $SBu_2$ | 220 | 4.0 | 32 |
| Ex. 25 | $SBu_2$ | 235 | 10.0 | 9.5 |
| Ex. 26 | $SBu_2$ | 235 | 6.0 | 15.3 |
| Ex. 27 | $SBu_2$ | 235 | 4.0 | 22.5 |
| Ex. 28 | $SBu_2$ | 250 | 10.0 | 9.6 |
| Ex. 29 | $SBu_2$ | 250 | 6.0 | 16 |
| Ex. 30 | $SBu_2$ | 250 | 4.0 | 17.4 |
| Ex. 31 | MeSEtOH | 220 | 10.0 | 16.7 |
| Ex. 32 | MeSEtOH | 220 | 6.0 | 24.9 |
| Ex. 33 | MeSEtOH | 220 | 4.0 | 33.4 |
| Ex. 34 | MeSEtOH | 235 | 10.0 | 12.1 |
| Ex. 35 | MeSEtOH | 235 | 6.0 | 18.6 |
| Ex. 36 | MeSEtOH | 235 | 4.0 | 27 |
| Ex. 37 | MeSEtOH | 250 | 10.0 | 8.6 |
| Ex. 38 | MeSEtOH | 250 | 6.0 | 14.9 |
| Ex. 39 | MeSEtOH | 250 | 4.0 | 22.9 |

Examples 40-45 (Comparative Examples 18-23)

Figure 3:
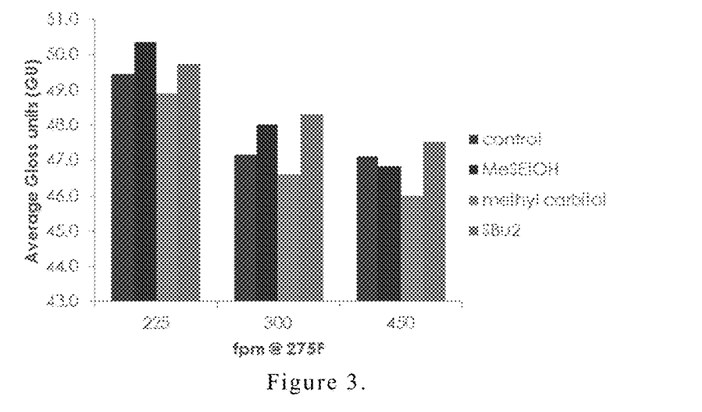
FIG. 3 is a graph comparing the gloss for formulations containing additives of different refractive index.

Examples 40-48 were prepared similar to 11-19 except with a formulation containing SL6900/SL6020 (Si—H/Si-vinyl=1.8) and 0.25 wt % S61 on CCK. The examples using the sulfur based additives included 5 molar equivalents of sulfur compound to 1 mole of platinum. The temperature and oven dwell time was varied as indicated. Gloss for the cured composition was evaluated by a 60° gloss meter. The results are shown in Table 6 and FIG. 3.

TABLE 6

Cure and gloss data for formulations with and without sulfur additives

| | Additive | Temperature (F.) | Oven dwell time (s) | % Extractables | Gloss (GTU) |
|---|---|---|---|---|---|
| Comp. Ex. 18 | none | 275 | 4.0 | 7.3 | 49.5 |
| Comp. Ex. 19 | none | 275 | 3.0 | 7.7 | 47.2 |
| Comp. Ex. 20 | none | 275 | 2.0 | 9.6 | 47.1 |
| Ex. 40 | MeSEtOH | 275 | 4.0 | 7 | 50.4 |
| Ex. 41 | MeSEtOH | 275 | 3.0 | 8.2 | 48.0 |
| Ex. 42 | MeSEtOH | 275 | 2.0 | 9.4 | 46.8 |
| Comp. Ex. 21 | Methyldiglycol | 275 | 4.0 | 7 | 48.9 |
| Comp. Ex. 22 | Methyldiglycol | 275 | 3.0 | 7.4 | 46.6 |
| Comp. Ex. 23 | Methyldiglycol | 275 | 2.0 | 9.3 | 46.0 |
| Ex. 43 | $SBu_2$ | 275 | 4.0 | 6.5 | 49.7 |
| Ex. 44 | $SBu_2$ | 275 | 3.0 | 7.4 | 48.3 |
| Ex. 45 | $SBu_2$ | 275 | 2.0 | 8.7 | 47.5 |

As illustrated in Table 6, using the present sulfur additives provides comparable or better gloss compared to the compositions without the additive and run under similar conditions (e.g., oven dwell time)

Examples 46-48 (Comparative Example 24)

A flask was charged with a stock Karstedt solution (10 g, 12.5 wt % Pt in $M^{vi}M^{vi}$). The Karstedts solution was diluted with 240 g of xylenes to afford a 5000 ppm Pt stock solution. Aliquots of this stock solution (30 g) were placed in a separate jar and treated with the additives ($SBu_2$ or $MeSCH_2CH_2OH$). The material was placed under $N_2$ and stored in the fridge at (−5° C.) for 80 days and the yellowing of the solution was measured. Table 7 shows the results of these tests. As illustrated in Table 7, yellowing is reduced with the use of the sulfur additives.

TABLE 7

Yellowing of aged stock solutions of Karstedts with and without $SR_2$ additives.

| | Additive | Equiv Additive/Pt | Hazen |
|---|---|---|---|
| Comp. Ex. 24 | None | NA | 178 |
| Ex. 46 | $SBu_2$ | 5 | 81 |
| Ex. 47 | MeSEtOH | 5 | 27 |
| Ex. 48 | $SBu_2$ | 2 | 84 |

Example 49

Figure 4:
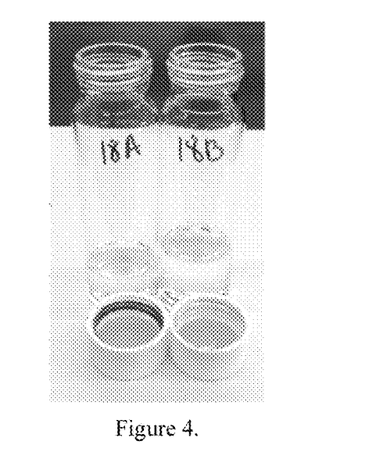
FIG. 4 is a picture showing reaction products using stock solutions after aging at 40° C. for 30 hours with (i) a Karstedt catalyst (left) and (ii) a Karstedt with SBu$_2$ additives (right).

A vial was charged with a stock Karstedt solution (8 g, 9.9 wt % Pt in $M^{vi}M^{vi}$, 0.004 mol). The $SBu_2$ (3.5 g, 0.02 mol) was added to the Karstedt solution. The material was heated in air at 40° C. for over 30 hrs. For comparison, a second vial was charged with a stock Karstedt solution (8 g, 9.9 wt % Pt in $M^{vi}M^{vi}$, 0.004 mol) and heated to 40'C for 30 hours in air. FIG. 4 shows a picture of the vials with the above solutions. The vial on the left is the composition without any sulfur additive, and the vial on the right is the composition with the sulfur additive. The vial on the left shows formation of black solid on the cap, which results from decomposition of the platinum catalyst.

Example 50

Figure 5:
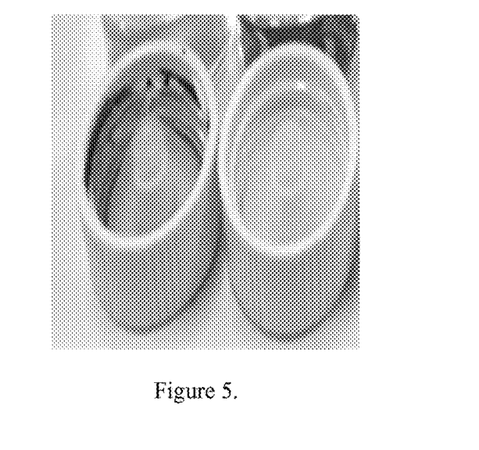
FIG. 5 is a picture showing reaction products using stock solutions after aging at 40° C. for 30 hours with (i) a Karstedt catalyst (left) and (ii) a Karstedt with SBu$_2$ additives (right).

A vial was charged with a stock Karstedt solution (5 g, 10.3 wt % Pt in $M^{vi}M^{vi}$, 0.0026 mol). The $SBu_2$ (2.3 g, 0.013 mol) was added to the Karstedt solution. The material was stored in air at room temperature (25-30° C.) for 3 weeks. For comparison, a second vial was charged with a stock Karstedt solution (5 g, 9.9 wt % Pt in $M^{vi}M^{vi}$, 0.004 mol) and stored at 25-30° C. for 3 weeks in air. FIG. 5 shows a picture of the vials with the above solutions. The vial on the left is the composition without any sulfur additive, and the vial on the right is the composition with the sulfur additive. The vial on the left shows formation of black solid on the cap, which results from decomposition of the platinum catalyst.

Embodiments of the invention have been described above and modifications and alterations may occur to others upon the reading and understanding of this specification. The claims as follows are intended to include all modifications and alterations insofar as they come within the scope of the claims or the equivalent thereof.

What is claimed is:

1. A process for producing a crosslinked product comprising reacting a mixture constituting (a) an alkenyl silicone, (b) a hydrogen siloxane, (c) a cure inhibitor chosen from an ethylenically unsaturated amide, an aromatically unsaturated amide, an acetylenic compound, an ethylenically unsaturated isocyanate, an olefinic siloxane, an unsaturated hydrocarbon diester, an unsaturated hydrocarbon mono-ester of an unsaturated acid, a conjugated or isolated ene-yne, a hydroperoxide, a ketones, a sulfoxide, an amine, a phosphine, a phosphite, a nitrite, a diaziridine, or a combination of two or more thereof, and (d) a hydrosilylation catalyst, optionally in the presence of a solvent, and (e) a sulfur compound in order to produce the crosslinked product, the sulfur compound (e) being a compound of the formula:

$$R^1—S—R^2$$

where (i) $R^1$ and $R^2$ are independently chosen from a H a C1-C20 hydroxyalkyl, a C1-C20 carboxylic acid, or a combination thereof, or (ii) $R^1$ is chosen from a C1-C20 alkyl, and $R^2$ is chosen from a C1-C20 hydroxyalkyl, with the proviso that Formula I is not $H_2S$.

2. The process of claim 1, wherein the hydrosilylation catalyst (d) comprises a metal, and the ratio of total moles of the sulfur compound (e) to moles of the metal in catalyst (d) is from about 1:1 to about 100:1.

3. The process of claim 1, wherein the hydrosilylation catalyst (d) comprises a metal, and the ratio of total moles of the sulfur compound (e) to moles of the metal in catalyst (d) is from about 1:1 to about 10:1.

4. The process of claim 1, comprising the inhibitor (c) in an amount of from about 0.001 to about 10% by weight of the mixture.

5. The process of claim 1 comprising the inhibitor (c) in an amount of from about 0.01 to about 0.1% by weight of the mixture.

6. The process of claim 1, wherein the hydrosilylation catalyst is a platinum-based catalyst, and the platinum is present in an amount of from about 100 parts per billion to about 100 parts per million.

7. The process of claim 6, wherein the platinum is present in an amount of from about 1 ppm to about 50 ppm.

8. The process of claim 1, wherein the curable alkenyl silicone is of the formula:

$$M^{vi}_a T_b D_c M_d Q_e$$

wherein $M^{vi}_a = R^3_2 R^4 SiO_{1/2}$; $T_b = R^5 SiO_{3/2}$ where $R^5$ is chosen from $R^3$ or $R^4$; $D_c = R^3 R^5 SiO_{2/2}$ where $R^5$ is chosen from $R^3$ or $R^4$; $M_d = R^3_3 SiO_{1/2}$; and $Q_e = SiO_{4/2}$; $R^3$ is independently selected from a monovalent hydrocarbon radical having one to forty carbon, optionally containing at least one heteroatom; and $R^4$ is selected from a terminal olefinic monovalent hydrocarbon radical having two to forty carbon atoms, optionally containing at least one heteroatom, where the composition of the alkenyl silicone comprises at least two unsaturated groups reactive to hydrosilylation per chain; a≥0, b≥0, d≥0, e≥0; values for c in particular are determined by the desired properties and attributes of the crosslinked material so that the sum a+b+c+d+e is in the range 50-20,000.

9. The process of claim 1, wherein the hydrogen siloxane is chosen from a compound of the formula $M_{a'} M^H_{b'} D_{c'} D^H_{d'} T_{e'} T^H_{f'} Q_g$, where the subscripts a', b', c', d', e', f, and g are such that the molar mass of the siloxane-type reactant is between 100 and 100,000 Dalton; M is a monofunctional group of formula $R^6_3 SiO_{1/2}$, D is a difunctional group of formula $R^{15}_2 SiO_{2/2}$, T is a trifunctional group of formula $R^7 SiO_{3/2}$, and Q is a tetrafunctional group of formula $SiO_{4/2}$, $M^H$ is $HR^8_2 SiO_{1/2}$, $T^H$ is $HSiO_{3/2}$, and $D^H$ is $R^{10} HSiO_{2/2}$, where each occurrence of $R^{6-10}$ is independently chosen from a C1-C40 alkyl, a C1-C40 substituted alkyl, a C6-C14 aryl or substituted aryl, wherein $R^{6-10}$ optionally contains at least one heteroatom.

10. The process of claim 1, wherein the reaction is completed in about 10 seconds or less.

11. The process of claim 1, wherein the process is conducted by heating at a temperature of from about 0 to about 300° F.

12. The process of claim 1, wherein components (a)-(d) are provided in a single composition.

13. The process of claim 1, wherein components (a) and (e) are provided in a first part (i) optionally comprising component (c); component (b) is provided in a second part (ii); and component (d) is provided in a third part (iii), and the process comprises mixing parts (i), (ii), and (iii) to conduct the reaction.

14. The process of claim 1, wherein component (a) and optionally component (c) is provided in a first part; component (b) is provided in a second part (ii); and components (d) and (e) are provided in a third part (iii).

15. A composition for producing a crosslinked product, the composition comprising (a) an alkenyl silicone, (b) a hydrogen siloxane, (c) a cure inhibitor chosen from an ethylenically unsaturated amide, an aromatically unsaturated amide, an acetylenic compound, an ethylenically unsaturated isocyanate, an olefinic siloxane, an unsaturated hydrocarbon diester, an unsaturated hydrocarbon monoester of an unsaturated add, a conjugated or isolated ene-yne, a hydroperoxide, a ketones, a sulfoxide, an amine, a phosphine, a phosphite, a nitrite, a diaziridine, or a combination of two or more thereof, and (d) a hydrosilylation catalyst, optionally in the presence of a solvent, and (e) a sulfur compound in order to produce the crosslinked product, the sulfur compound (e) being a compound of the formula:

$$R^1-S-R^2$$

where (i) $R^1$ and $R^2$ are independently chosen from a H a C1-C20 hydroxyalkyl, a C1-C20 carboxylic acid, or a combination thereof, or (ii) $R^1$ is chosen from a C1-C20 alkyl, and $R^2$ is chosen from a C1-C20 hydroxyalkyl, with the proviso that Formula I is not $H_2S$.

16. The composition of claim 15, wherein the hydrosilylation catalyst (d) comprises a metal, and the ratio of total moles of the sulfur compound (e) to moles of the metal in catalyst (d) is from about 1:1 to about 100:1.

17. The composition of claim 15, wherein the hydrosilylation catalyst (d) comprises a metal, and the ratio of total moles of the sulfur compound (e) to moles of the metal in catalyst (d) is from about 1:1 to about 10:1.

18. The composition of claim 15, comprising the inhibitor (c) in an amount of from about 0.001 to about 10% by weight of the mixture.

19. The composition of claim 15 comprising the inhibitor (c) in an amount of from about 0.01 to about 0.1% by weight of the mixture.

20. The composition of claim 15, wherein the hydrosilylation catalyst is a platinum-based catalyst, and the platinum is present in an amount of from about 100 parts per billion to about 100 parts per million.

21. The composition of claim 20, wherein the platinum is present in an amount of from about 1 ppm to about 50 ppm.

22. The composition of claim 15, wherein the curable alkenyl silicone is of the formula:

$$M^{vi}_a T_b D_c M_d Q_e$$

wherein $M^{vi}_a = R^3_2 R^4 SiO_{1/2}$; $T_b = R^5 SiO_{3/2}$ where $R^5$ is chosen from $R^3$ or $R^4$; $D_c = R^3 R^5 SiO_{2/2}$ where $R^5$ is chosen from $R^3$ or $R^4$; $M_d = R^3_3 SiO_{1/2}$; and $Q_e = SiO_{4/2}$; $R^3$ is independently selected from a monovalent hydrocarbon radical having one to forty carbon, optionally containing at least one heteroatom; and $R^4$ is selected from a terminal olefinic monovalent hydrocarbon radical having two to forty carbon atoms, optionally containing at least one heteroatom, where the composition of the alkenyl silicone comprises at least two unsaturated groups reactive to hydrosilylation per chain; a≥0, b≥0, d≥0, e≥0; values for c in particular are determined by the desired properties and attributes of the crosslinked material so that the sum a+b+c+d+e is in the range 50-20,000.

23. The composition of claim 15, wherein the hydrogen siloxane is chosen from a compound of the formula $M_{a'} M^H_b D_c D^H_{d'} T_e T^H_f Q_g$, where the subscripts a', b', c', d', e', f, and g are such that the molar mass of the siloxane-type reactant is between 100 and 100,000 Dalton; M is a monofunctional group of formula $R^6_3 SiO_{1/2}$, D is a difunctional group of formula $R^{15}_2 SiO_{2/2}$, T is a trifunctional group of formula $R^7 SiO_{3/2}$, and Q is a tetrafunctional group of formula $SiO_{4/2}$, $M^H$ is $HR^8_2 SiO_{1/2}$, $T^H$ is $HSiO_{3/2}$, and $D^H$ is $R^{10} HSiO_{2/2}$, where each occurrence of $R^{6-10}$ is independently chosen from a C1-C40 alkyl, a C1-C40 substituted alkyl, a C6-C14 aryl or substituted aryl, wherein $R^{6-10}$ optionally contains at least one heteroatom.

24. A cured material prepared from the process of claim 1.

25. The cured material of claim 24, wherein the cured material is a coating.

26. A substrate having a surface thereof at least partially coated with the coating of claim 25.

27. The substrate of claim 26, wherein the coating is a release coating.

28. A cured material formed from the composition of claim 14.

* * * * *